Patented May 24, 1949

2,470,957

UNITED STATES PATENT OFFICE 2,470,957

SOFT SOLDERING FLUX

James E. Strader, Columbus, Ohio, assignor to Battelle Memorial Institute, Columbus, Ohio, a corporation of Ohio No Drawing. Application August 27, 1945, Serial No. 613,023

14 Claims. (Cl. 148—25)

This invention relates to soft solder fluxes comprising a glutamic acid compound and to methods of soldering employing such fluxes. More particularly, the present invention relates to soft solder fluxes comprising a glutamic acid compound and an organic amino compound, especially a primary diamine compound.

Soft soldering fluxes formerly were primarily either one of two types, namely, inorganic chlorides or rosin. Rosin fluxes proved to be fairly satisfactory on copper and a few other metals and left noncorrosive residues, but were not sufficiently active to effectively flux metals such as zinc or nickel and left residues that were water insoluble. The inorganic chlorides possessed great fluxing activity, but were highly corrosive and left electrically conductive residues on the work which gave rise to electrical leakage.

The use of amine hydrochlorides as fluxes marked a considerable improvement in the fluxing art, since these fluxes could be used with about as many metals as the inorganic chlorides and were very much less corrosive. They still, however, produced highly toxic fumes during the soldering operation and the residue that remained was corrosive and electrically conductive in addition to being water insoluble.

It is, therefore, an object of this invention to provide a soft solder flux which leaves a water soluble residue that is noncorrosive and nonconductive.

Another object of this invention is to provide a soft solder flux which does not produce toxic fumes during the soldering operation.

Still another object of this invention is to provide a soft soldering flux which is easily produced on a commercial basis due to its wide permissible variation in composition and simplicity of production.

A further object of this invention is to provide a flux which may be compounded in a variety of forms.

Still another object of this invention is to provide a soft solder flux capable of effecting good soldering action with low-tin soldering alloys.

Other objects and advantages of this invention will become apparent from the following detailed description.

It has been found that glutamic acid compounds are characterized by certain properties which especially suit them for soft solder fluxes. The term "glutamic acid compounds" is defined as including glutamic acid and the salts formed by the reaction of glutamic acid with hydrogen halide acids and inorganic bases of the alkali and alkaline earth metals. Illustrative of acid addition salts is glutamic acid hydrochloride, whereas the salts produced from the acid-base reaction may be exemplified by the mono-sodium salt of glutamic acid. Mineral acids, in general, will react with glutamic acid to produce satisfactory fluxes but the halogen acids are much preferred because the mineral acid radical serves only to make the glutamic acid water soluble and the halogen acids are the most readily split off. As a result, there can be no complicating factors introduced by the addition acid radical. The inorganic bases comprise the alkaline earth hydroxides as well as the alkali metal hydroxides, but the latter are preferable because of greater solubility in water.

These glutamic acid compounds have been found to be more satisfactory for fluxing purposes when combined with other ingredients, such as primary diamines of the class illustrated by hexamethylenetetramine, diethylenetriamine, and urea. Other amine compounds such as triethanolamine may be also employed. Although the glutamic acid compounds are not all available in a commercially pure state, the impurities contained therein are generally not deleterious and many of the impure compounds may be readily used for purposes of this invention.

The glutamic acid compounds may be employed either alone or in combination with the above-designated organic amines in the form of powders, but it is highly preferable for purposes of this invention to dissolve these ingredients in some suitable liquid, preferably water. Glutamic acid hydrochloride and sodium glutamate are readily soluble in water, but glutamic acid is relatively insoluble in water and in alcohol. Upon heating, however, this compound dissolves readily in water at 60° C. and may be employed as a flux either at this elevated temperature in solution or in a suspension at room temperature. As regards the use of liquid flux compositions, it may be stated that, in general, relatively dilute solutions, that is, solutions that contain between about 6% and about 25% solids are preferred and an excess of the glutamic acid compound over the other compounds present is generally desirable in order to obtain the most satisfactory fluxing action.

At least about 5% by weight of the glutamic acid compound in water solution should be employed in order to produce an effective flux. The amount of primary diamine or other amine compound employed along with the glutamic acid compound will vary according to the type of solder employed, the character of the metals being soldered and the particular type of soldering operation to be performed. For sodium glutamate and glutamic acid, the amount of amine added thereto is not critical, but with glutamic acid hydrochloride it is desirable to employ sufficient organic amino compound to act as a diluent to prevent corrosion of the work by the hydrochloride in the glutamic acid hydrochloride structure. Of all the types of residues left by the glutamic acid compounds, only those left by the glutamic acid hydrochloride, as well as other addition acid compounds, and mixtures of glutamic acid hydrochloride with insufficient amounts of diluent agents leave a corrosive residue. Since this residue is water soluble, it may be rapidly removed and thus eliminate any corrosion of the work. The exact amount of any particular diamine which will satisfactorily dilute the glutamic acid addition acid compounds varies, of course, from one compound to the other, but with urea, for example, this lower limit is reached at about a ratio of 1 part urea to 7 parts of glutamic acid hydrochloride, or 14% urea based on the hydrochloride present. At the upper end of the range approximately 7 parts of urea to 1 part of glutamic acid hydrochloride approaches the limit of a satisfactory flux composition.

It is apparent from what has heretofore been said that the present flux is capable of wide variations, but a series of compositions which have been found to be highly preferable and which are characterized with especially suitable fluxing properties are those compounds in which the glutamic acid compound and amino compound are present in a molecular ratio of approximately 3 to 4. A composition illustrating this feature comprises 13.7% by weight of glutamic acid hydrochloride, 7.8% of urea and 78.5% of water. These liquid fluxes can be diluted with 4 parts of water to 7 parts of liquid flux and still retain as good fluxing action as the more concentrated fluxes. This ratio applies to the other glutamic acid compounds as well as to glutamic acid hydrochloride.

In certain applications the addition of a wetting agent has proved to be beneficial in obtaining better spreading properties on the work as well as better wetting of the solder. Any of the usual wetting agents, especially those intended for use in acid solutions, may be used and about ½% to about 1% is generally enough to achieve the desired result.

The fluxes comprising the present invention may be formulated in any one of a number of ways, depending, of course, upon the particular form in which it is to be used. When the fluxing ingredients are to be employed as powders, they may be mixed with the other ingredients in the dry state without further processing. The liquid fluxes are very simply prepared, but special procedures specific to each compound or combination of compounds are advantageously employed. When making up solutions of glutamic acid hydrochloride and urea, it should be noted that the dissolution of these compounds in water is an endothermic action and the solution must be heated in order to obtain complete dissolution. Temperatures varying from about 60° C. to about 80° C. have proved to be satisfactory, although subsequent filtering through glass wool or the like to remove undissolved material is still required for the best results. In making up a four liter batch of soldering flux comprising glutamic acid hydrochloride and urea, for example, the glutamic acid hydrochloride may be dissolved in 3500 cc. of water at 60° C., the urea in 500 cc. of water at the same temperature and separate from the glutamic acid hydrochloride, and the two solutions then mixed. Another method which has been satisfactorily employed and which, from a commercial standpoint has certain advantages, comprises mixing the glutamic acid hydrochloride and urea in the dry state and dissolving the thus mixed ingredients in the entire amount of water to be added at an elevated temperature, such as 60° C. In either case the solution is allowed to settle for a time dependent upon the amount of undissolved material contained therein and then filtered.

As noted above glutamic acid is but slightly soluble in water at room temperature. At 60° C. or above, this compound is readily soluble, although it precipitates out again at temperatures below about 50° C. The glutamic acid is preferably dissolved at or above 60° C. and used as a flux either alone or in combination with a suitable amino compound at this elevated temperature. If desired, however, the solution may be cooled and the suspension thus formed may be satisfactorily employed as a flux by shaking it up slightly before using.

For certain very specific uses the flux comprising this invention may be formulated in the form of a paste or crayon. The method of producing the paste comprises simply mixing the fluxing ingredients to be employed, for example, a glutamic acid powder and an amino compound, and incorporating these ingredients into petrolatum or similar material. As an example of a paste, 11.5 parts of glutamic acid hydrochloride and 6.5 parts of urea were mixed together and added to 82 parts by weight of petrolatum. The incorporation of the fluxing ingredients in the petrolatum may be effected by milling, mortar and pestle, or other convenient means.

The flux may be made in crayon form, in a number of ways, but one which has been found to be especially desirable comprises making an emulsion of one part aqueous flux (containing 13.7% glutamic acid hydrochloride, 7.8% urea and 78.5% water) with one part of a neutral oil such as a mineral oil by adding a small amount of a suitable emulsifier and passing the mixture through a homogenizer. The resulting emulsion may then be re-emulsified along with an equal weight of carnauba wax by passing it again through the homogenizer. The resulting mixture may be cast in any desired shape.

In employing water solutions of the fluxing ingredients comprising the present invention, it should be kept in mind that the present fluxes are designed specifically as soft solder fluxes to be used below 650° F. It should also be noted that, although the residue from the fluxes comprising the present invention are noncorrosive (other than those exceptions above noted), water solutions of these fluxes, especially those containing the glutamic acid hydrochloride, are corrosive to many metals in the cold state. For this reason, precautions should be taken not to carelessly splatter the water solutions of the present fluxes upon the work. Pastes and crayons, as above described, are designed for special applications and are disadvantageous in that the presence of the waxy ingredients makes the residues insoluble in water and produces unsightly joints. Consequently the liquid solutions of the glutamic acid compounds, with or without the addition of other compounds, comprise the preferred class of the present invention.

Fluxes comprising the present invention efficiently clean the metal surfaces to be joined and facilitate the flow of solder thereon. Moreover such fluxes are capable of efficiently fluxing a wide variety of metals, including copper, brass, bronze, silver, gold, platinum, manganin, constantin, zinc, tin, electrotin, palladium, germanium, chromium, galvanized steel, and stainless steel. Furthermore, these fluxes have the unusual characteristic of permitting satisfactory soldering with tin-lead solders containing as little as 5% tin as compared with the usual solders containing 40% tin. Since the materials comprising the fluxes of the present invention are nonhygroscopic and noncorrosive in the dry state, they may be easily kept without deterioration. A particularly outstanding advantage of the fluxes of the instant invention over the prior art fluxes is the lack of toxic fumes during the soldering operation. Heretofore all fluxes have been employed under hoods to carry away the fumes formed during the soldering operation. This requires considerable bulky equipment for each operator and is, therefore, expensive and space consuming. Fluxes comprising the present invention have been employed on a commercial basis without the use of hoods in air conditioned rooms without any trace of toxic fumes. Since the toxic fumes from the prior art fluxes presented a major personnel problem, the importance of the nontoxicity of these glutamic acid compound fluxes is considerable from a commercial standpoint.

Another feature which marks the glutamic acid compound fluxes from those of the prior art is the solubility of their residues in water, along with the fact that such residues are nonconductive and, except for glutamic acid hydrochloride, etc., noncorrosive. Conductivity tests conducted on soldered joints employing fluxes of the prior art and those of the present invention showed that only those fluxes of the present invention were completely nonconductive. Salt spray corrosion tests made on metal-plated articles indicated that the fluxes comprising the present invention were the only ones of all those tested which did not destroy the thin metal plate and open the way for corrosion of the basis metal. Since all of these residues, however, are water soluble, the fact that they are noncorrosive and nonconductive is not as material as with residues which are not water soluble. The residues from the glutamic acid fluxes may be easily washed off with water following the soldering operation, so that the soldered joint is left completely free from residues of any kind and needs no further preparation for painting or the like.

At the present time it is not completely understood why the gutamic acid compounds should so distinctly differentiate from other amino acid groups in their characteristics which suit them for soft solder fluxes. One possible point of difference may lie in the fact that glutamic acid and its closely related compounds will form an inner-ring structure upon heating which has special properties. Whether or not the formation of this inner-ring is responsible for the fact that glutamic acid compounds themselves produce a fluxing action whereas other amino acids do not, cannot be definitely stated, but it appears highly logical that the relative unstability of the glutamic acid compounds is in a large measure responsible for the rapid loss of the hydrochloride radical of the glutamic acid hydrochloride structure. Acid hydrochlorides of the prior art have depended entirely for their fluxing action upon the hydrochloride radical attached thereto, and residues thereof have shown analyses containing various amounts of chlorine. The glutamic acid compounds, however, are in no way dependent for their fluxing action upon the hydrochloride radical, obviously, since the glutamic acid itself and its basic salts may be employed.

The toxicity of these amino acids cannot be attributed solely to the hydrochloride attached, since aniline, betaine, and other amino acids are themselves toxic and the presence of the hydrochloride radical increases this toxicity very little. Glutamic acid, on the other hand, is not toxic and the addition of the hydrochloride radical thereto does not produce toxic fumes. The fact that glutamic acid compounds leave water soluble residues whereas very similar amino acid compounds leave insoluble charred residues is difficult to explain. One possible theory may be that, unlike many of the amino acids, glutamic acid melts and does not volatilize so that it does not recondense upon the hot surfaces. It may be that during these condensation stages the amino acids of the prior art become charred and form the insoluble residues consisting essentially of carbon. Regardless of the correctness of the above-stated theories, it has been proven to be a fact that glutamic acid compounds function in a manner materially different from other amino acids and obtain results not heretofore achieved by fluxes of the prior art.

In summarizing the invention as above described, it is evident that it relates to the production of soft solder fluxes from glutamic acid compounds, which fluxes have the outstanding characteristics of being nontoxic, nonconductive, noncorrosive, and having water soluble residues as well as a high fluxing efficiency which permits the use of lead-tin solders containing as little as 5% tin. Fluxes comprising this invention have found wide application in the electrical industry as well as in other industries where high soldering requirements are present.

Variations and modifications of the present invention, as above described, will become apparent to those skilled in the art. For example, more than one glutamic acid compound may be used in any one flux as well as a plurality of primary diamines or other amino compounds. The preferred composition will vary according to the particular metals to be joined, the solders to be employed, and other particularities of the soldering operation. Thus, a wetting agent may be highly useful in the soldering operations where considerable spread of the solder is desired and will be detrimental in other operations such as soldering of small pinholes where spread of the solder is highly undesirable.

What is claimed is:

1. A soft solder flux comprising a mixture of a glutamic acid compound and an organic amino compound.

2. A soft solder flux comprising a mixture of a glutamic acid compound and a primary diamine aliphatic compound.

3. A soft solder flux comprising a mixture of glutamic acid and a primary diamine aliphatic compound.

4. A soft solder flux comprising as the two major ingredients the salt formed by reacting glutamic acid with a halogen acid, and an aliphatic amino compound.

5. A soft solder flux comprising as the two major ingredients the salt formed by reacting glutamic acid with an alkali metal hydroxide, and an organic amine.

6. A soft solder flux in which the active ingredients consist essentially of glutamic acid hydrochloride and urea.

7. As a soft solder flux, a water solution containing between about 6% to about 25% solids which consist essentially of a glutamic acid hydrohalide compound and urea, said urea being present in a ratio of at least 1 to 7 of the glutamic acid hydrohalide compound.

8. A soft solder flux consisting essentially of a mixture of a glutamic acid compound and an amino compound in molecular proportions of 3 to 4, respectively, and a dispersing medium for said mixture.

9. A soft solder flux consisting essentially of a mixture of glutamic acid hydrochloride, urea, and petrolatum in the proportions of about 11.5% glutamic acid hydrochloride, about 6.5% urea, and about 82% petrolatum.

10. A soft solder flux consisting essentially of a salt formed by reacting lutamic acid with a halogen acid, and urea in an amount equal to about 14% by weight of said salt.

11. A soft solder flux in the paste form, which comprises essentially a glutamic acid compound, at least 14% urea based on the glutamic acid compound, and a suitable unctious dispersing medium.

12. A soft solder flux in the form of a crayon, which comprises one part of an aqueous flux consisting essentially of water, a glutamic acid compound and an organic amine, one part of neutral oil, and two parts of carnauba wax.

13. A soft solder flux consisting essentially of a mixture of glutamic acid hydrochloride, urea, and water in the proportions of about 13.7% glutamic acid hydrochloride, about 7.8% urea, and about 78.5% water.

14. A soft solder flux comprising essentially a mixture of a glutamic acid compound, an organic amino compound, water, and a wetting agent.

JAMES E. STRADER.

REFERENCES CITED

The following references are of record in the file of this patent:

UNITED STATES PATENTS

| Number | Name | Date |
|---|---|---|
| 1,341,938 | Shoemaker | June 1, 1920 |
| 1,785,134 | McQuaid | Dec. 16, 1930 |
| 1,882,734 | Barber | Oct. 18, 1932 |
| 1,990,273 | Dykstra | Feb. 5, 1935 |
| 2,306,667 | Smith, Jr. | Dec. 29, 1942 |

OTHER REFERENCES

The Condensed Chemical Dictionary, third edition, Jan. 1942, page 326, Reinhold Publ. Co., New York.

Handbook of Chemistry and Physics, 27th edition, Feb. 1943, pages 460, 461, 796 to 799. Chemical Rubber Publ. Co., Cleveland, Ohio.

Thorpe's Dictionary of Applied Chemistry, fourth edition, vol. VI, page 34, publ., 1943, by Longmans, Green and Co., New York.

Certificate of Correction

Patent No. 2,470,957. May 24, 1949.

JAMES E. STRADER

It is hereby certified that error appears in the printed specification of the above numbered patent requiring correction as follows:

Column 7, line 25, claim 10, for "lutamic" read *glutamic*;

and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*